United States Patent [19]

Litt

[11] 4,070,856
[45] Jan. 31, 1978

[54] AIR FLOW CONTROL SYSTEM AND IMPROVED MULTIPLE POSITION SWITCHING MEANS FOR USE THEREWITH

[75] Inventor: Kenneth Curtis Litt, Silver Spring, Md.

[73] Assignee: Pace, Incorporated, Silver Spring, Md.

[21] Appl. No.: 739,787

[22] Filed: Nov. 8, 1976

[51] Int. Cl.² .............................................. F15B 11/06
[52] U.S. Cl. ................................. 60/407; 137/625.21; 251/304; 417/306
[58] Field of Search .................... 137/625.21; 251/160, 251/304; 417/306; 60/407, 412, 494, 397

[56] References Cited

U.S. PATENT DOCUMENTS

| | | | |
|---|---|---|---|
| 1,582,468 | 4/1926 | Heald et al. | 91/7 |
| 1,989,600 | 1/1935 | Meisel et al. | 137/625.21 X |
| 2,215,115 | 9/1940 | Buffington | 60/472 |

Primary Examiner—Edgar W. Geoghegan
Attorney, Agent, or Firm—Gerald J. Ferguson, Jr.; Joseph J. Baker

[57] ABSTRACT

Air flow control system comprising a pump having an air pressure outlet and a vacuum outlet; an air utilization device such as a desolderer; and a multi-position switch having first and second input ports respectively connected to the air pressure and vacuum outlets of the pump, the switch being positionable in a number of different positions whereby either one of the pump outlets can be selectively connected to the desolderer and the other vented to the atmosphere to prevent loading of the pump. In a neutral mode of operation, the desolderer is disconnected from the pump and both pump outlets are vented to the atmosphere to again prevent loading thereof. The switch also includes means for continuously varying the amount of air pressure applied to the desolderer.

10 Claims, 11 Drawing Figures

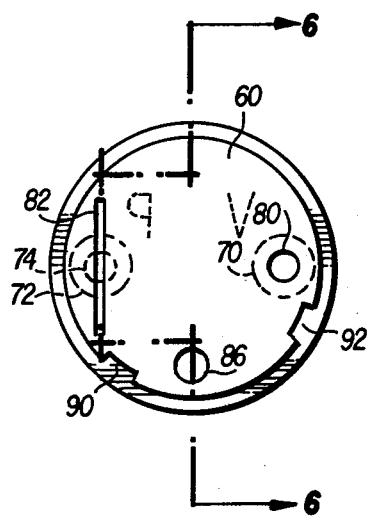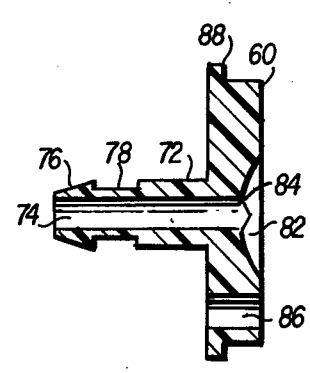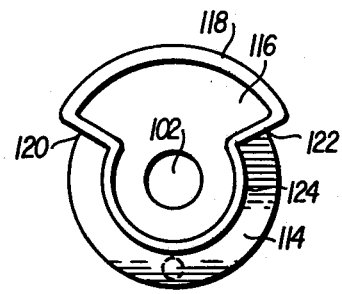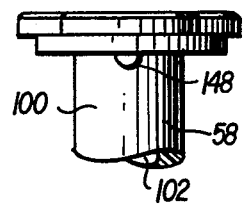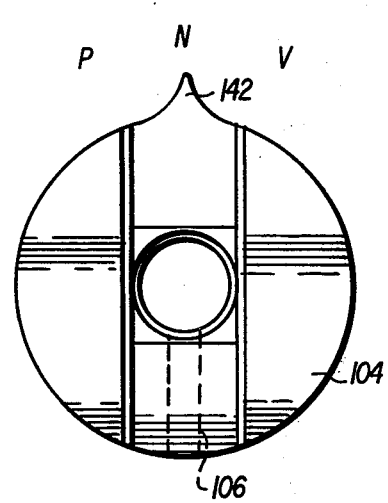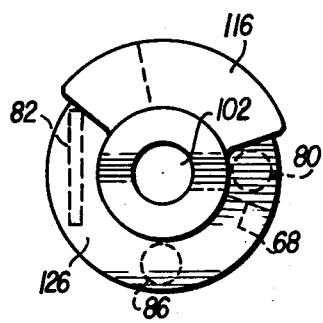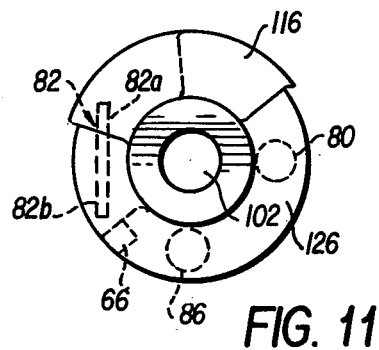

AIR FLOW CONTROL SYSTEM AND IMPROVED MULTIPLE POSITION SWITCHING MEANS FOR USE THEREWITH

BACKGROUND OF THE INVENTION

1. Field of the Invention

This invention relates to fluid flow control systems and improved switching means for use therein.

2. Discussion of the Prior Art

Certain rotary type valves are known in the fluid flow control art such as U.S. Pat. Nos. 1,121,140 to Schoonmaker, 2,271,331 to Elliott, 2,567,428 to Greeley, 3,297,052 to Robinson, and 3,892,259 to McClocklin. Further, it is known to respectively connect lines to the vacuum and air pressure outputs of a pump and employ discrete switching means in each of the lines. However, the foregoing prior art system does not lend itself to rapid conversion from one mode of operation (that is, vacuum, for example) to another mode (that is, air pressure, for example), where the air pressure may or may not be continuously variable in magnitude.

SUMMARY OF THE INVENTION

It is thus a primary object of this invention to provide an improved fluid flow control system wherein fluid at either high (such as air under pressure) or low (such as a vacuum) pressure may be applied to a fluid utilization device from a pump having high and low pressure outlets and where a change-over from one mode of operation to another can be quickly effected in a single switching device without loading the pump.

It is a further object of this invention to provide an improved switching device of the foregoing type.

It is a further object of this invention to provide an improved switching device wherein the amount of air pressure, for example, diverted therethrough may be continuously varied.

It is a further object of this invention to provide an improved switching device of the above type wherein both vacuum and air pressure may be disconnected from the utilization device without loading of the pump.

Other objects and advantages of this invention will be apparent from a reading of the following specifications and claims taken with the drawing.

BRIEF DESCRIPTION OF THE DRAWING

FIG. 4 is an end view thereof and FIG. 3 is a cross-sectional view taken along the line 3—3 of FIG. 4.

FIGS. 5 and 6 are views of an illustrative hose fitting end plate for use in the switch of FIG. 2 where FIG. 5 is an end view thereof and FIG. 6 is a cross-sectional view taken along the line 6—6 of FIG. 5.

FIGS. 7 and 8 are views of an illustrative bypass valve for use in the switch of FIG. 2 wherein FIG. 7 is an end view thereof and FIG. 8 is a plan view.

FIG. 9 is an end view of an illustrative knob for use in the switch of FIG. 2.

FIGS. 10 and 11 are diagrammatic views illustrating the different modes of operation of the switch of FIG. 2.

DETAILED DESCRIPTION OF A PREFERRED EMBODIMENT OF THE INVENTION

Figure 1:
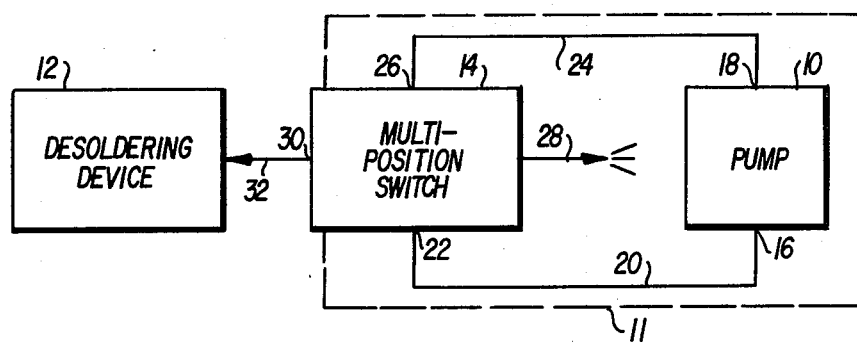
FIG. 1 is a block diagram of an improved air flow control system in accordance with the invention.

Referring to FIG. 1, there is shown an improved air flow control system in accordance with the invention. A pump 10 is connected to a device 12 which, for example, may be a desoldering device or the like, via a three-way air switch 14. The pump 10 may, for example be any conventional type pump such as a motor pump for producing a vacuum at an outlet or low pressure port 16 and air under pressure at another outlet or high pressure port 18. The vacuum is connected via a line 20 to an inlet port 22 of switch 14 while the air under pressure is connected via line 24 to an inlet port 26 of switch 14. Switch 14 also has vent port 28 and an outlet port 30, which is connected to device 12 via line 32. Lines 20, 24 and 32 may be hoses or the like.

Switch 14 is capable of being placed in three separate positions which thereby define three separate modes of operation for the system of FIG. 1. Thus, if switch 14 is set in its neutral or zero mode and if pump 10 is activated, the vacuum in line 20 and the air pressure in line 24 will both be vented out port 28 to the atmosphere to thereby prevent loading of pump 10. No output will be connected to device 12 via line 32.

If switch 14 is set in its vacuum mode, the vacuum in line 20 is diverted to device 12 while the pressure in line 24 is vented out port 28 to prevent loading of pump 10. Thus, if device 12 is a desoldering device the vacuum may be utilized to suck molten solder from an electrical connection or the like.

If switch 14 is in its graduated pressure mode, the air under pressure in line 24 is diverted to device 12 while the vacuum in line 20 is vented out port 28 to again prevent loading of pump 10. As will be described in more detail hereinafter, switch 14 includes rotatable means whereby the air flow in line 32 can be gradually increased by gradually diverting more of the air under pressure from line 24 to line 32. The air which is not diverted to line 32 is vented out port 28 together with the vacuum in line 20. Hence, the amount of air under pressure utilized at device 12 may be selectively determined. Thus, if load 12 were a desoldering device or the like, the air could be utilized to blow away loose bits of solder from around an electrical connection.

Figure 2:
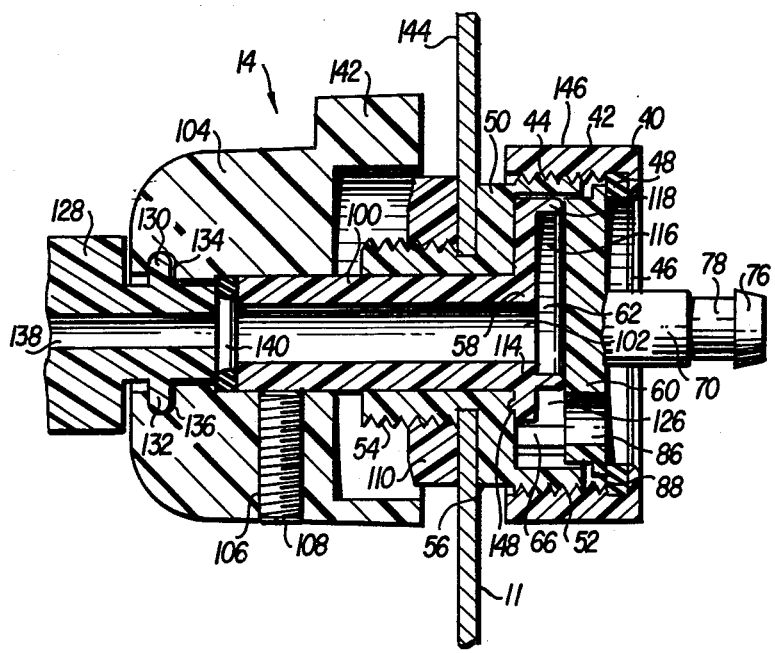
FIG. 2 is a cross-sectional view of an assembled, illustrative, multi-position switch in accordance with the invention for use in the system of FIG. 1.

Referring now to FIG. 2, there is shown a cross-sectional view of an assembled, illustrative switch 14 in accordance with the invention while in FIGS. 3–9 there are illustrated various views of the parts comprising the switch shown in FIG. 2. Referring to FIG. 2, a cap 40 is provided. Cap 40 is knurled at 42, internally threaded at 44 and is provided with a circular opening 46 in the end thereof. An annular seal 48 is provided in the internal seat of cap 40, the opening of seal 48 being substantially co-extensive with the opening 46 of cap 40.

Figure 3:
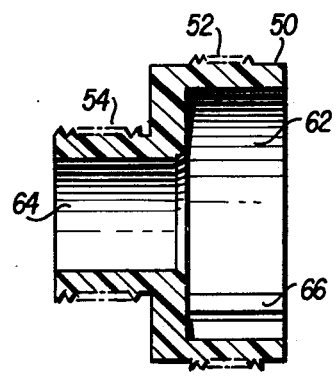
FIGS. 3 and 4 are views of an illustrative valve body for use in the switch of FIG. 2 where
Figure 4:
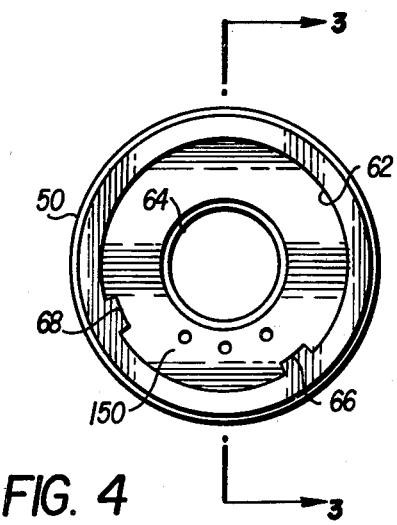

The cap 40 is threaded onto a valve body 50 which has two pairs of external threads 52 and 54 separated by a flange 56. Cap 40 and valve body 50 press a bypass valve 58 to a hose fitting end plate 60. The valve body 50 is shown in further detail in FIGS. 3 and 4. As can be seen in these Figures and FIG. 2, the valve body 50 includes a circular, inner main chamber 62 which communicates with circular passageway 64 which extends to the forward end of body 50. As can be seen in FIG. 4, chamber 62 is provided with two stops 66 and 68, the purpose of which will be described in more detail hereinafter. Only stop 66 is shown in FIGS. 2 and 3. As can be seen in FIG. 4, the stops 66 and 68 are arranged at different angles with respect to the horizontal plane. However, as will become evident hereinafter, the particular position of these stops is not critical.

Referring now to FIGS. 2, 5 and 6, the hose fitting end plate 60 will be discussed in further detail. Extending rearwardly from the switch 14 are two hose fittings 70 and 72 which respectively correspond to inlet ports 22 and 26 of FIG. 1. The view shown of plate 60 in FIG. 5 is from the inside of chamber 62 of FIG. 2. The hose fittings 70 and 72 are identical and fitting 72 has a passageway 74 extending therethrough, as can be seen in FIG. 6. Each of the fittings has a conical-shaped end portion 76 and a groove 78 for facilitating the reception of a rubber hose or the like over the fitting.

The termination of passageway 74 is different from that of the passageway for vacuum fitting 70. Thus, as can be seen in FIG. 5, the passageway for fitting 70 terminates as a circular opening 80 in end plate 60 while passageway 74 for pressure fitting 72 terminates as a slot 82. As can be seen in FIG. 6, slot 82 extends into plate 70 and engages passageway 74 so that passageway 74 intersects the slot at 84 but does not penetrate the surface of end plate 60.

Vent hole 86, which corresponds to port 28 of FIG. 1, extends through end plate 60 as can be seen in FIGS. 2, 5 and 6. As can be seen in FIGS. 2, 5 and 6, end plate 60 is provided with a flange portion 88 which is sealed against seal 48 as cap 40 is tightened over valve body 50. The plate 60 is also provided with two slots 90 and 92 which engage stops 66 and 68 when the switch is assembled as shown in FIG. 2 to thereby eliminate relative rotational movement with respect to valve body 50 and end plate 60. Further, plate 60 has provided thereon the letters "V" and "P" respectively adjacent the hose fittings 72 as indicated in FIG. 5 to thereby facilitate proper interconnection between pump 10 and switch 14.

Reference should now be made to FIGS. 2, 7 and 8 for a further discussion of bypass valve 58. As can be seen in FIGS. 2 and 8, valve 58 includes a tubular portion 100 having a passageway 102 extending therethrough. Passageway 102 corresponds to outlet port 30 of FIG. 1. Mounted on the front end of tubular portion 100 is knob 104. Extending through knob 104 is an internally threaded portion 106 into which is threaded a set screw 108 which engages tubular portion 100 and which causes bypass valve 58 to rotate with the rotation of knob 104. Thus, as knob 104 is rotated, bypass valve 58 is rotated within chamber 62. As will be brought out in more detail hereinafter, the rotation of bypass valve 58 to different positions within chamber 62 determines the mode of operation of the system as discussed hereinbefore with respect to FIG. 1. Valve body 50 is held in place during rotation of bypass valve 58 by nut 110 which is threaded onto threads 54 and which holds the valve body 50 against a housing wall 11 which is indicated in FIG. 1 by dotted lines. Alternatively, switch 14 may be portable. If so, threads 54, nut 110 and wall 11 may be dispensed with. Thus, valve body 50 would be held relatively stationary with one hand of the operator while knob 104 is rotated with the other hand.

Bypass valve 58 has disposed at the end thereof an end plate 114 as can best be seen in FIG. 7. A fan-shaped chamber 116 is disposed on plate 114. Chamber 116 communicates with opening 102 and, as will be described in more detail hereinafter, depending on the position of chamber 116 with respect to openings 80 and 86 and slot 82 of plate 60, switch 14 is set in one of the modes of operation discussed hereinbefore. As can be seen in FIG. 2, chamber 116 is pressed into engagement with end plate 60 by cap 40 which is threaded over valve body 50. In particular, bypass valve 58 slidingly engages end plate 60 to thereby facilitate rotation of valve 58 with respect to plate 60. Referring to FIGS. 2, 7 and 8, it can be seen that chamber 116 is defined by four walls and in particular a circular wall 118 which is disposed outside the periphery of plate 114 and circularly extends about opening 102, a pair of radially extending walls 120 and 122 which extend inwardly toward the center of plate 114 and a circular wall 124 which extends around opening 102 and engages walls 120 and 122 at the innermost portions thereof. When plate 114 is disposed in chamber 62 as shown in FIG. 2, the stops 66 and 68 of FIG. 4 define the limits of rotation of plate 114 within chamber 62. That is, when plate 114 is at the limit of its angular rotation in one direction, wall 120 will engage stop 68 whereas when it is at its other limit, wall 122 will engage stop 66.

In addition to the formation of chamber 116 in the assembled switch 14 of FIG. 2, a second chamber 126 is also formed as can be seen. This chamber as will be explained in more detail hereinafter, is instrumental in the venting function performed by the switch and it can be seen that this chamber is in communication with vent hole 86 in FIG. 2. Further, it can be seen in FIG. 2 that chamber 62 defines a main chamber which is subdivided into a first subchamber 116 and a second subchamber 126 by bypass valve 58.

The passageway 102 communicates with a hose fitting 128 to which line 32 of FIG. 1 is connected. Fitting 128 may be of the same general type as fittings 70 and 72. Fitting 128 includes a pair of projections 130 and 132 which extend into a pair of recessed portions 134 and 136 in knob 104. Passageway 138 of fitting 128 communicates with passageway 102 where fitting 128 is separated from tube 100 of valve body 50 by O-ring 140 which provides an air-tight connection therebetween.

Disposed on knob 104 is a pointer 142 which can also be seen in FIG. 9. Also shown in FIG. 9 are the indicia "P", "N" and "V". These indicia would be provided on wall 11 of FIG. 2 generally at 144 of FIG. 2 if the switch 14 is mounted on a housing wall or the like. Alternatively, the indicia of FIG. 9 would be disposed at 146 on cap 40 as indicated in FIG. 2 if the switch were employed in a portable manner.

Further, in order to provide discrete settings for the different modes of operation, a detent 148 may be provided on plate 114 of the bypass valve 58. This detent may comprise a small semi-circular projection as shown in FIG. 2. A plurality of semi-circular recesses 150 would also be employed extending concentrically about opening 64 of valve body 50 to mate with detent 148 and thereby effect the desired discrete positioning of switch 14 for the various modes of system operation. This latter feature is optional.

In operation, assume first the pointer 142 of knob 104 is pointing at the "N" indicia on wall 11. This indicates that the switch 14 is so set that the system is in its neutral or zero mode — that is, both the pressure and vacuum outlets of pump 10 are connected through switch 14 out vent 28 with no output at all to desoldering device 12. In particular, referring to FIG. 10, there is shown a view of bypass valve 58 in relationship to end plate 60 as viewed from the front end of the bypass valve. Thus, chamber 116 is so positioned with respect to holes 80 and 86 and slot 82 that both hole 80 and slot 82 communicate with hole 86 whereby the vacuum out of line 80 is diverted through chamber 126 of FIG. 2 to vent hole 86 as is the pressure from slot 82. Hence, there is no loading of pump 10 during the neutral mode of operation.

If knob 104 is turned so that pointer 142 points toward the "V" position, the system is set in its vacuum mode which is diagrammatically indicated in FIG. 10. In particular, chamber 116 will be rotated to the indicated dotted line position whereby the vacuum from vent hole 80 is diverted through chamber 116 to passageway 102 for utilization by desoldering device 12 and the pressure from slot 82 is vented out hole 86 via chamber 126.

Referring to FIG. 11, there is a diagrammatically illustrated the positions of chamber 116, vis-a-vis openings 80 and 86 and slot 82 for partial and full pressure modes of operation. Thus, if pointer 142 of knob 104 is partially turned toward the "P" indicia, the chamber 116 will assume the solid line position shown in FIG. 11 whereby the air pressure from portion 82a of slot 82 is diverted therefrom through chamber 116 to passageway 102 for utilization by desoldering device 12. The remaining pressure from slot 82 is diverted from portion 82b of slot 82 through chamber 126 of FIG. 2 to vent hole 86. Further, since chamber 116 is no longer in communication with vacuum opening 80, the vacuum is also vented out hole 86 via chamber 126.

For full pressure utilization by desoldering device 12, the pointer 142 of knob 104 is turned fully toward the "P" indicia whereby, as can be seen, chamber 116 assumes its dotted line position shown in FIG. 11. Thus, slot 82 is in full communication with chamber 116 to bypass full pressure through opening 102 to desoldering device 12. As can be appreciated from FIGS. 4 and 5, the stop 66 is operative in FIG. 11 to limit the angular rotation of chamber 116 with respect to slot 82 and thereby establish the full pressure mode setting. Further, as can be seen in FIGS. 4, 5 and 10, stop 68 is operative to establish the other limit of rotation for chamber 116 whereby the vacuum mode setting is realized.

From the foregoing it can now be seen that there has been described a three-way switch for use with a pump whereby vacuum or graduated air pressure can be applied to a device such as a desolderer without loading the pump and where the system may also be employed in a neutral or zero mode whereby the pump is completely disconnected from the desolderer without pump loading.

What is claimed is:

1. An air flow control system comprising
an air pump having a vacuum outlet port and an air pressure outlet port;
an air utilization device;
a switch comprising
a switch outlet port connected to said air utilization device;
a vent port;
a vacuum inlet port connected to said air pump vacuum outlet port;
an air pressure inlet port connected to said air pump air pressure outlet port; and
valve means for (a) connecting said vacuum inlet port to said switch outlet port and said air pressure inlet port to said vent port in response to said switch being in a first position and (b) connecting said air pressure inlet port to said switch outlet port and said vacuum inlet port to said vent port in response to said switch being in a second position
whereby either vacuum or air pressure may be switched from said air pump to said air utilization device without loading the pump.

2. A system as in claim 1 where said valve means connects both said air pressure inlet port and said vacuum inlet port to said vent port in response to said switch being in a third position so that said air pump is not loaded when neither said vacuum nor said air pressure are connected to said air utilization device.

3. A system as in claim 1 where said air utilization device is a desolderer.

4. A system as in claim 1 where said valve means includes means for gradually controlling the amount of air pressure switched from said air pump to said air utilization device.

5. A system as in claim 1 where said switch includes enclosure means for defining a main chamber within said switch, said main chamber communicating with said switch outlet port, said vent port, said vacuum inlet port and said air pressure inlet port and said valve means includes movable means for dividing said main chamber into first and second subchambers so that (a) when said movable means is in said first position said vacuum inlet port is connected to said switch outlet through said first subchamber and said air pressure inlet port is connected to said vent port through said second subchamber and (b) when said movable means is in said second position said air pressure inlet port is connected to said switch outlet port through said first subchamber and said vacuum inlet port is connected to said vent port through said second subchamber.

6. A system as in claim 5 where said movable means, when in a third position, connect both said air pressure inlet port and said vacuum inlet port to said vent port through said second subchamber so that said air pump is not loaded when neither said vacuum nor said air pressure are connected to said air utilization device.

7. A system as in claim 5 where said valve means includes means for gradually controlling the amount of air pressure switched from said air pump to said air utilization device.

8. A system as in claim 7 including means for gradually moving said movable means to any position between said first and second positions and where said air pressure inlet port includes an elongated opening which communicates with said main chamber, so that said amount of air pressure which is switched from said air pump to said utilization device can be controlled in accordance with the position of said movable means with respect to said elongated opening whereby when partial pressure is switched to said air utilization device, a first portion of the air from said elongated opening is diverted to said switch outlet port through said first subchamber and the remaining portion of the air from said elongated opening is diverted to said vent port through said second subchamber.

9. An air flow control switch for use with an air pump having a vacuum outlet port and an air pressure outlet port, said switch comprising
a switch outlet port;
a vent port;
a vacuum inlet port adapted for connection to said air pump vacuum outlet port;
an air pressure inlet port adapted for connection to said air pump air pressure outlet port; and valve means for (a) connecting said vacuum inlet port to said switch outlet port and said air pressure inlet port to said vent port in response to said switch being in a first position and (b) connecting said air pressure inlet port to said switch outlet port and said vacuum inlet port to said vent port in response to said switch being in a second position so that either vacuum or air pressure may be switched from said air pump to said switch outlet port without loading the air pump.

10. A switch as in claim 9 where said valve means connects both said air pressure inlet port and said vacuum inlet port to said vent port in response to said switch being in a third position so that said air pump is not loaded when neither said vacuum nor said air pressure are connected to said outlet port.

* * * * *